United States Patent
Koike et al.

(10) Patent No.: US 7,468,395 B2
(45) Date of Patent: Dec. 23, 2008

(54) FOAMABLE OIL-IN-WATER TYPE EMULSION

(75) Inventors: Shin Koike, Tokyo (JP); Shinji Yamamoto, Tokyo (JP)

(73) Assignee: Kao Corporation, Tokyo (JP)

( * ) Notice: Subject to any disclaimer, the term of this patent is extended or adjusted under 35 U.S.C. 154(b) by 197 days.

(21) Appl. No.: 10/671,591

(22) Filed: Sep. 29, 2003

(65) Prior Publication Data

US 2004/0106688 A1  Jun. 3, 2004

(30) Foreign Application Priority Data

Sep. 30, 2002 (JP) ............................. 2002-286185

(51) Int. Cl.
*B01F 3/04* (2006.01)
*A23D 7/005* (2006.01)
*B01F 17/34* (2006.01)
*A23L 1/00* (2006.01)
*A23L 1/035* (2006.01)

(52) U.S. Cl. ............................ 516/18; 516/10; 516/16; 426/564; 426/602

(58) Field of Classification Search .................. 516/10, 516/16, 18; 426/564, 602
See application file for complete search history.

(56) References Cited

U.S. PATENT DOCUMENTS

| | | | | |
|---|---|---|---|---|
| 2,296,457 A | * | 9/1942 | Schutte | 516/10 |
| 3,224,883 A | | 12/1965 | Pader et al. | 426/116 |
| 4,127,679 A | | 11/1978 | Amano et al. | 426/565 |
| 4,390,550 A | * | 6/1983 | Kahn et al. | 426/102 |
| 4,533,254 A | * | 8/1985 | Cook et al. | 366/176.1 |
| 5,160,759 A | * | 11/1992 | Nomura et al. | 426/602 |
| 5,378,286 A | * | 1/1995 | Chiou et al. | 127/36 |
| 5,891,495 A | * | 4/1999 | Cain et al. | 426/607 |
| 5,962,058 A | | 10/1999 | Ono et al. | 426/564 |
| 6,025,006 A | * | 2/2000 | Miller et al. | 426/564 |
| 6,040,161 A | * | 3/2000 | Cain et al. | 435/134 |
| 6,143,348 A | * | 11/2000 | Cain et al. | 426/601 |

FOREIGN PATENT DOCUMENTS

| | | |
|---|---|---|
| EP | 0 402 090 | 12/1990 |
| JP | 53-32164 | 3/1978 |
| JP | 63-301765 | 12/1988 |
| JP | 64-63341 | 3/1989 |
| JP | 3-8431 | 1/1991 |
| JP | 4-300826 | 10/1992 |
| JP | 7-313066 | 12/1995 |
| JP | 8-103236 | 4/1996 |
| JP | 9-510622 | 10/1997 |
| JP | 10-176181 | 6/1998 |
| JP | 2002-10738 A | 1/2002 |
| WO | WO 95/29596 | 11/1995 |

OTHER PUBLICATIONS

Rodriguez Patino et al, "Interfacial characteristics of diglyceride monolayers at the air/aqueous phase interface", Colloids and Surfaces A: Physicochemical and Engineering Aspects 168 (2000) pp. 35-43 (month unavailable), Obtained online @ www.elsevier.nl/locate/colsurfa.*

Effects of Different Forms of Dietary Hydrogenated Fats On Serum Lipoprotein Cholesterol Levels, Lichtenstein, et al., The New England Journal of Medicine, vol. 340, Jun. 24, 1999, No. 25, pp. 1933-1940.

* cited by examiner

*Primary Examiner*—Daniel S Metzmaier
(74) *Attorney, Agent, or Firm*—Oblon, Spivak, McClelland, Maier & Neustadt, P.C.

(57) ABSTRACT

The present invention relates to a foamable oil-in-water type emulsion comprising the following (A) and (B): (A) from 3 to 50% by weight of an oil phase containing fat or oil including from 1 to 69.9% by weight of triglycerides, from 0.1 to 9% by weight of monoglycerides and from 30 to 90% by weight of diglycerides, wherein 80% by weight or more of the fatty acides in the diglycerides are unsaturated fatty acids, and wherein the content of saturated fatty acids is less than 40% by weight and the content of trans acids is less than 10% by weight, based on the total amount of fatty acids in the fat or oil; and (B) from 50 to 97% by weight of a water phase containing 1 to 80% by weight of sugars and/or sugar alcohols, which has good foaming characteristics, flavor and the like.

17 Claims, No Drawings

FOAMABLE OIL-IN-WATER TYPE EMULSION

FIELD OF THE INVENTION

The present invention relates to a foamable oil-in-water emulsion.

BACKGROUND OF THE INVENTION

Liquid diglycerides have been found to have effects such as decreasing the accumulation of body fats and preventing obesity (JP-A10-176181 or JP-A4-300826). Also, liquid diglycerides are known to have characteristics of enhancing a milky taste and full-body taste when used in coffee cream compositions containing an oil-in-water type emulsion (JP-A 3-8431). From this point of view, fat or oil compositions having a high liquid diglyceride content are used as domestic edible oils.

There is a desire to use such liquid diglycerides having a health benefit in broader applications. For example, utilization of fat or oil in ice cream coating composition is known (JP-A 9-510622). In general, fat or oil (triglycerides) having saturated fatty acids and trans acids in a high content are used as foaming fat or oil applicable to frozen sweets and the like. There are technologies (JP-A 7-313066, JP-A 8-103236 or JP-A 2002-10738) using diglycerides having a high content of a specific saturated fatty acid when using diglycerides and technologies ensuring good foaming characteristics and foam shape-keeping ability by a combination of a liquid diglyceride having a low saturated fatty acid content and a hydrogenated oil (JP-A 63-301765). Also, water-in-oil type frozen sweets using liquid diglycerides are disclosed (JP-A 64-63341).

In the meantime, hydrogenated oils which are widely used as foaming fat or oil have not only a high saturated fatty acid content but also a high trans acid content. As typical trans acids, elaidic acid is known and a method of applying the foaming characteristics and foam shape-keeping ability thereof to an ice cream is known (JP-A 53-32164). However, studies have been recently made as to the influence of saturated acids and trans acids on health and there are some trends toward limiting its intake (Alice, H. Lichtenstein, et al., EFFECT OF DIFFERENT FORMS OF DIETARY HYDROGENATED FATS ON SERUM LIPOPROTEIN CHOLESTEROL LEVELS, "The New England Journal of Medicine", USA, the Massachusetts Medical Society, vol. 340, No. 25, pages 1933 to 1940 (1999))

SUMMARY OF THE INVENTION

The present invention provides a foamable oil-in-water type emulsion containing the following (A) and (B):

(A) from 3 to 50% by weight of an oil phase comprising fat or oil, containing from 1 to 69.9% by weight of triglycerides, from 0.1 to 9% by weight of monoglycerides and from 30 to 90% by weight of diglycerides, wherein 80% by weight or more of the fatty acids in the diglycerides are unsaturated fatty acids, wherein less than 40% by weight of the fatty acids in the fat or oil are saturated fatty acids, and wherein less than 10% by weight of the fatty acids in the fat or oil are trans acids; and (B) from 50 to 97% by weight of a water phase, wherein the water phase contains from 1 to 80% by weight of sugars, sugar alcohols, and mixtures thereof.

DETAILED DESCRIPTION OF THE INVENTION

It has been desired that the liquid diglycerides be formulated in various products since they have excellent health benefits as mentioned above.

However, when a liquid diglyceride is combined with hydrogenated fat or oil, the desired foaming characteristics are met, but it in undesirable to have such high amounts of saturated fatty acids and trans acids. Also, water-in-oil type frozen sweets have a problem in that they have an oily taste, thus does not have an "aqueous taste" (e.g. a watery, non-oily taste) because they have an oil phase as the outer phase.

Therefore, the present invention provides a foamable oil-in-water type emulsion which has good foaming characteristics, foam shape-keeping ability and pleasant feeling in the mouth, possesses a good flavor such as a high quality sweet taste, an aqueous taste and fresh taste, is reduced in the content of saturated fatty acids and trans acids and has an increased diglyceride content thereby having many health benefits.

The inventors of the present invention has studied the foaming characteristics of an emulsion by varying the ratio of diglyceride in fat or oil, the content of fatty acid and the content of trans acids, and, as a result, found a relationship between the foaming characteristics and the content of saturated fatty acids or the content of trans acids, to realize the present invention. The inventors have also unexpectedly found that the sweet-taste quality derived from sugars tends to be significantly improved and the sweet taste is more significant, particularly, when the emulsion is formed and the specific gravity is therefore lowered and when the emulsion particle diameter is made smaller, to realize the present invention. Although not wanting to be limited by theory, it is believed that because diglycerides contain more hydroxyl groups than conventional fat or oil (triglycerides) by one hydroxy group, a sweet taste is improved due to high affinity of the hydroxyl group to sugars. This is a unique phenomenon caused by the fact that the polarity of diglycerides is higher than that of triglycerides and this phenomenon has been unknown so far.

The foamable oil-in-water emulsion of the invention has good foaming characteristics, foam shape-keeping ability and pleasant feeling in the mouth, possesses a good flavor such as a high quality sweet taste, aqueous taste, fresh taste and a good flavor, is reduced in the content of saturated fatty acids and trans acids and is increased in the content of diglycerides having many health benefits.

All designations of "%" are hereinbelow indicated on a weight basis.

As used herein, the term "fatty acid" or "fatty acids" includes constituent fatty acids as well as free fatty acids.

The fat or oil to be used in the oil phase (A) in the present invention contains from 30 to 90% of diglycerides. The amount of diglycerides is preferably from 35 to 90%, more preferably from 50 to 90%, even more preferably from 70 to 90% and even more preferably from 80 to 90% in view of physiological effects, industrial productivity, foaming characteristics, foam shape-keeping ability and flavor.

From 80% or more to preferably 100% of the fatty acids of the diglycerides are unsaturated fatty acids. Preferably 90 to 100%, more preferably 93 to 98% and even more preferably from 94 to 98% of these unsaturated fatty acids are those having 10 to 24 and preferably 16 to 22 carbon atoms, in view of pleasant feeling in the mouth, foaming characteristics, foam shape-keeping ability, flavor and physiological effects of the fat or oil.

Among the preferred fatty acids constituting the diglycerides, particularly, the amount of oleic acid is from 20 to 65%, preferably from 25 to 60%, even more preferably from 30 to 50% and even more preferably from 30 to 45% in view of pleasant feeling in the mouth, foam shape-keeping ability and the intake balance between fatty acids of the fat or oil. Further, the content of olein-olein diglyceride is preferably less than 45% and more preferably from 0 to 40%, in view of the physiological effects of the fat or oil.

Among the preferred fatty acids constituting the diglycerides, the content of linoleic acid is from 15 to 65%, preferably from 20 to 60%, more preferably from 30 to 55% and even more preferably from 35 to 50%, in view of pleasant feeling in the mouth, foam shape-keeping ability, flavor and the intake balance between fatty acids of the fat or oil. The preferred ratio by weight of linoleic acid/oleic acid to be contained is from 0.01 to 2.0, preferably from 0.1 to 1.8 and more preferably from 0.3 to 1.7, in view of oxidation stability and physiological effects of the fat or oil.

Among the preferred fatty acids constituting the diglycerides, the content of linolenic acid is less than 15%, preferably from 0 to 13%, more preferably from 1 to 10% and even more preferably from 2 to 9% in view of pleasant feeling in the mouth, foam shape-keeping ability, flavor, the intake balance of fatty acids and oxidation stability of the fat or oil. Although as to linolenic acid, $\alpha$-linolenic acid and $\gamma$-linolenic acid are known as isomers, $\alpha$-linolenic acid is preferable.

Among the preferred fatty acids constituting the diglycerides, the content of saturated fatty acids is 20% or less. The content is preferably from 0 to 15%, more preferably from 0 to 10%, even more preferably from 2 to 7% and even more preferably from 2 to 6% in view of pleasant feeling in the mouth, foam shape-keeping ability, foaming characteristics, flavor, physiological effects and industrial productivity of the fat or oil. As the saturated fatty acids, those having 14 to 24 and particularly 16 to 22 carbon atoms are preferable and palmitic acid and stearic acid are more preferable.

Among the preferred fatty acids constituting the diglycerides, the content of the trans acids is from 0 to 10%, preferably from 0.1 to 7%, more preferably from 0.1 to 5%, even more preferably from 0.1 to 4% and even more preferably from 0.1 to 3.5% in view of physiological effects, industrial productivity, pleasant feeling in the mouth, foam shape-keeping ability, foaming characteristics and flavor especially fresh taste of the fat or oil. The trans acid as used herein means an acid having a trans-formation at at least one carbon-carbon double bond of the fatty acids. The remainder constituent fatty acids are those having 14 to 24 and particularly preferably 16 to 22 carbon atoms.

It is desirable to use diglycerides in which the proportion of 1,3-diglycerides is 50% or more, more preferably from 55 to 100%, even more preferably from 60 to 90% and even more preferably from 60 to 80% in view of physiological effects, preserving characteristics, industrial productivity and flavor of the fat or oil.

The oil phase of the fat or oil to be used in the present invention contains from 1 to 69.9% of triglycerides. The content of the triglycerides is preferably from 3 to 64.9%, more preferably from 5 to 49.9%, even more preferably from 8 to 29.9% and even more preferably from 8.5 to 19.9% in view of physiological effects, industrial productivity, foam shape-keeping ability, foaming characteristics and flavor of the fat or oil.

It is preferred that from 80 to 100%, preferably from 90 to 100%, more preferably from 93 to 100%, even more preferably from 93 to 98% and even more preferably from 94 to 98% of the constituent fatty acids of the triglycerides be unsaturated fatty acids having 10 to 24 and preferably 16 to 22 carbon atoms in view of foam shape-keeping ability, foaming characteristics, pleasant feeling in the mouth, physiological effects and industrial productivity of the fat or oil.

Although the content of monoglycerides in the fat or oil to be used in the present invention is from 0.1 to 9%, in view of flavor, foam shape-keeping ability, foaming characteristics, emulsification and industrial productivity of the fat or oil, it is preferably from 0.1 to 7%, more preferably from 0.1 to 5%, even more preferably from 0.1 to 2% and even more preferably from 0.1 to 1.5%. The constituent fatty acid of the monoglycerides is preferably the same as that of the diglycerides in view of industrial productivity and pleasant feeling in the mouth of the fat or oil.

Among all the fatty acids in the fat or oil, the content of saturated fatty acids is from 40% or less. The content is preferably from 0 to 20%, more preferably from 0 to 10%, even more preferably from 2 to 7% and even more preferably from 2 to 6%, in view of foam shape-keeping ability, foaming characteristics, pleasant feeling in the mouth, flavor, physiological effects and industrial productivity of the fat or oil. As the saturated fatty acids, those having 14 to 24 and particularly 16 to 22 are preferable and palmitic acid and stearic acid are more preferable.

Among the fatty acids in the fat or oil, less than 10% by weight are trans acids, preferably from 0.1 to 7%, more preferably from 0.1 to 5%, even more preferably from 0.1 to 4% and even more preferably from 0.1 to 3.5%, in view of physiological effects, industrial productivity, pleasant feeling in the mouth, shape-keeping ability, foaming characteristics and flavor especially fresh taste of the fat or oil. The remaining constituent fatty acids are those having preferably 14 to 24 and more preferably 16 to 22 carbon atoms.

Also, the preferred content of free fatty acids (salts) in the fat or oil to be used in the present invention is decreased to 3.5% or less, preferably from 0 to 2%, more preferably 0 to 1%, even more preferably from 0 to 0.5% and even more preferably from 0.05 to 0.2%, in view of flavor and industrial productivity of the fat or oil.

The preferred content of fatty acids having four or more carbon-carbon double bonds in all the fatty acids constituting the fat or oil to be used in the present invention is from 0 to 40%, preferably from 0 to 20%, more preferably from 0 to 10% and even more preferably from 0 to 1% and it is most preferable that such fatty acids be not substantially contained in view of oxidation stability, operability, physiological effects and coloring.

The origins of the fat or oil to be used in the present invention may be either vegetable or animal fat or oil. Specific examples of the raw materials may include rape seed oil, sunflower oil, corn oil, soybean oil, rice oil, safflower oil, cotton seed oil and the like. Products obtained by classifying these fat or oil and mixing these products and products obtained by adjusting the composition of fatty acids by an ester exchange reaction or the like may be utilized as the raw materials. It is preferable that any source has a decreased content of trans acids. In particular, it is preferable from the viewpoint of taste, melting in the mouth and full-body taste to combine diglycerides with fat or oil including little trans acids, such as palm fraction fat or oil or a completely hydrogenated fat or oil, at a mixing ratio of 90:10 to 60:40, more preferably 80:20 to 65:35.

The fat or oil to be used in the present invention may be obtained, for example, by an esterifying reaction of the fatty acids originated from the aforementioned fat or oil with glycerol and by an ester exchange reaction of fat or oil with glycerol. The excess monoglycerides generated by the reaction can be removed by a molecular distillation method (thin film distillation) or chromatographic method. Although these methods may be carried out by a chemical reaction using, for example, an alkali catalyst, it is preferable to run these reactions under an enzymatically mild condition using 1,3-position selective lipase or the like in view of reducing trans acids, flavors and the like. Also, it is preferable to run these reactions under a mild condition to suppress isomerization in a refining step after the enzymatic reaction is finished. To state in more detail, after-treatments such as a deodorizing process are preferably performed at a temperature less than 235° C. and particularly 230° C. or less.

In the emulsion of the present invention, the content of the oil phase (A) is from 3 to 50%. The content of the oil phase (A) is preferably from 5 to 40%, more preferably from 7 to 35%, even more preferably from 10 to 30% and even more preferably from 15 to 25% in view of an aqueous feel, sweet taste, emulsifying ability, foaming characteristics and the like.

The water-phase (B) according to the present invention contains from 1 to 80% of sugars and/or sugar alcohols. The content of the sugars and/or sugar alcohols is preferably from 5 to 70%, more preferably from 7 to 60%, even more preferably from 10 to 50% and even more preferably from 15 to 35%, in view of an aqueous taste, sweet taste, emulsifying ability, preservation characteristics and the like of the fat or oil. Examples of the sugars and/sugar alcohols include glucose, fructose, maltose, sucrose, lactose, sucralose, sorbitol, maltitol, erythritol, xylitol, trehalose, reduced starch saccharides, isomerized sugars and various starch syrups. These sugars and/sugar alcohols are preferably added so as to limit the water activity to 0.96 or less and preferably 0.94 or less as an emulsion in view of preservation characteristics.

In the emulsion according to the present invention, the content of the water phase (B) is from 50 to 97%. The content of the water phase (B) is preferably from 60 to 95%, more preferably from 65 to 93%, even more preferably from 70 to 90% and even more preferably from 75 to 85%, in view of an aqueous taste, sweet taste and emulsifying ability of the fat or oil.

It is preferable that the emulsion according to the present invention further contains an emulsifier. Examples of the emulsifier may include mono-/di-glycerides of organic acids such as citric acid and lactic acid, polyglycerin fatty acid esters, sucrose fatty acid esters, sorbitan fatty acid esters, propylene glycol fatty acid ester and lecithins. The number of carbons of the fatty acid bound in the emulsifier is preferably 12 to 18 and particularly preferably 14 to 18 in view of flavor and emulsification characteristics of the fat or oil. It is also preferable to use an emulsifier having an HLB value of 8 or more, preferably 12 or more and particularly preferably 14 or more. It is more desirable to use an emulsifier having an HLB value less than 8, preferably less than 6 and more preferably less than 4 together with the above emulsifier. The content of these emulsifiers is preferably from 0.1 to 5 parts by weight, more preferably from 0.1 to 3 parts by weight, even more preferably from 0.2 to 2 parts by weight and even more preferably from 0.3 to 1 parts by weight based on 100 parts by weight of the emulsion, in view of foaming characteristics, emulsification characteristics, preservation characteristics pleasant feeling in the mouth and flavor of the fat or oil. Particularly, the ratio by weight of the fat or oil to the emulsifier contained in the oil phase is preferably from 25/1 to 5/1, more preferably from 20/1 to 5/1 and even more preferably from 18/1 to 5/1 in view of, of micronization of an emulsion particle diameter, foaming characteristics, pleasant feeling in the mouth and flavor of the fat or oil.

It is desirable that the emulsion according to the present invention further contains a protein. Examples of the protein may include casein, whey protein, skim milk powder, whole milk powder, butter milk powder, soybean protein and the like. Also, salts of milk protein such as sodium caseinate may be used. Further, raw materials containing protein such as milk, crude milk, fresh cream, skimmilk, butter milk, sweetened condensed milk and evaporated milk may be used. The content of these proteins is preferably from 0.1 to 10 parts by weight, more preferably from 0.1 to 7 parts by weight, even more preferably from 0.2 to 5 parts by weight and even more preferably from 0.3 to 3 parts by weight in view of foaming characteristics, emulsifying ability, preservation characteristics, foam shape-keeping ability, pleasant feeling in the mouth and flavor of the fat or oil.

As a stabilizer to be added as desired, for example, alkali metal salts of phosphoric acids (e.g., hexamethaphosphate and secondary phosphoric acid) or citric acid or gams such as guar gum and xanthane gum may be used.

Also, examples of flavors and essences may include milk flavors, vanilla flavors, vanilla essences, chocolate flavors, fruits flavors and the like.

It is preferable that the emulsion used in the present invention further contains an antioxidant.

The content of the antioxidant is preferably from 0.001 to 5 parts by weight, more preferably from 0.004 to 0.4 parts by weight and even more preferably from 0.008 to 0.3 parts by weight based on 100 parts by weight of the emulsion in view of oxidation stability, coloring, flavor and the like of the fat or oil.

As the antioxidant, those used in food applications are preferable. Examples of antioxidants include natural antioxidants such as vitamin E, butylhydroxytoluene (BHT), butylhydroxyanisole (BHA), tertiary butylhydroquinone (TBHQ), vitamin C or its derivatives, phospholipids, rosemary extracts and catechin. Among them, vitamin E, vitamin C or its derivatives and catechin are preferable. It is preferable to use two or more types among these antioxidants.

It is preferable that the emulsion used in the present invention further contains vegetable sterols. These vegetable sterols are components having the effect of decreasing cholesterol. In the present invention, the content of the vegetable sterols is preferably from 0.05 to 4.7 parts by weight and more preferably from 0.3 to 4.7 parts by weight based on 100 parts by weight of the fat or oil. In general fat or oil produced from the starting material of fatty acids obtained by distillation, being commercially available, have a decreased amount of vegetable sterols. In such a case, vegetable sterols are preferably added such that the amount of the vegetable sterols falls in a range from 0.05 to 4.7 parts by weight.

Here, examples of the vegetable sterols include free bodies such as α-cytosterol, stigmasterol, campesterol, β-cytostanol, stigmastanol, campestanol and cycloartenol and ester bodies such as fatty acid esters, ferulates and cinnamates of these free bodies.

The pH of the foamable oil-in-water type emulsion of the present invention is preferably 3 to 8, more preferably 4 to 7.5 and even more preferably 5 to 7 at 25° C. in view of stability.

The foamable oil-in-water type emulsion of the present invention may be produced utilizing the aforementioned components in the same manner as in conventional methods. For example, an oily component (oil phase) containing fat or oil such as in a composition according to the present invention and an oil-soluble emulsion and an aqueous component (aqueous phase) containing water, protein, sugars and/or sugar alcohols and a water-soluble emulsifier are respectively raised to a proper temperature and are both mixed to preemulsify. The resulting emulsion is further subjected to typical treatments which is usually used, such as homogenization, sterilization, homogenization (re-homogenization), cooling and aging, whereby the foamable oil-in-water type emulsion of the present invention can be produced.

As an emulsifying method in the present invention, methods such as transfer emulsification, film emulsification and high-pressure emulsification and D-phase emulsification may be utilized. As specific conditions of high-pressure emulsification, the esterification is preferably carried out in the following process pressure condition: under a pressure of preferably 9.8 to 490 MPa, more preferably 29.4 to 392 MPa, even more preferably 49.0 to 294 MPa, even more preferably 78.5 to 196 MPa and even more preferably 98.1 to 196 MPa.

Also, the foamable oil-in-water type emulsion of the present invention may be prepared using a D-phase emulsifying method. The D-phase emulsifying method is a method in which fat or oil are dispersed in a surfactant solution containing a water-soluble polyhydric alcohol or containing a water-soluble polyhydric alcohol and water to prepare an O/D (D: surface-active agent) emulsion, to which water is added thereby making a fine O/W emulsion.

In the preparation of the above emulsion, typically used homogenizing machines such as a homogenizer may be utilized and it is desirable to carry out homogenizing treatment in the condition of 2000 to 25000 rpm and 1 to 30 minutes.

Particularly, it is preferable that the volume average particle diameter of the emulsion be designed to be 0.9 μm or less, preferably 0.01 to 0.7 μm, more preferably 0.03 to 0.5 μm, even more preferably 0.05 to 0.3 μm and even more preferably 0.07 to 0.2 μm, in view of improving the sweet-taste quality and decreasing the content of trans acids and saturated aliphatic acids of the fat or oil. The particle diameter by volume of the emulsion may be measured using a laser diffraction particle size analyzer (SALD-2100 model, manufactured by Shimazu Corporation) in the case where the particle diameter is 0.3 μm or more or using a light-scattering type particle size analyzer (LB-500 model, manufactured by Horiba Ltd.) in the case where the particle diameter is less than 0.3 μm.

In order to produce an emulsion having a particle diameter of 0.9 μm or less, for example, the following method may be adopted: a water phase and an oil phase are pre-emulsified in advance by using a homomixer or the like, the pre-emulsion is treated using a high-pressure homogenizer operated under a pressure of at least 50 MPa or more and then other components are added to the resulting emulsion.

The specific gravity of the product of the present invention is preferably 0.1 to 0.9 g/cm$^3$, more preferably 0.2 to 0.8 g/cm$^3$, even more preferably 0.3 to 0.7 g/cm$^3$ and even more preferably 0.4 to 0.7 g/cm$^3$, in view of flavor, pleasant feeling in the mouth, foam shape-keeping ability and operability though it depends on the type of fat or oil product.

The foaming product having the above specific gravity may be obtained by stirring the foamable oil-in-water emulsion of the present invention by the use of a mixer such as a Hobart mixer and hand mixer or whipper or ice-cream freezer.

Although no particular limitation is imposed on a method of measuring specific gravity, a volumetric method is preferable in consideration of viscosity.

The foamable oil-in-water type emulsion is superior in foaming characteristics, foam shape-keeping ability and pleasant feeling in the mouth, operability, flavor, and the like and may be therefore utilized for foods containing foamable fat or oil. The foamable oil-in-water type emulsion may be used specifically for food products such as ice creams such as an ice cream, ice milk and lacto-ice, whipped cream, milk shake, mousse, whipped mayonnaise, whipped dressing and the like. Also, the foamable oil-in-water type emulsion may be applied to health foods, functional foods, foods for specified health use, medical foods, which are aimed at promoting health by the exertion of a specific function.

EXAMPLES

The following examples further describe and demonstrate embodiments of the present invention. The examples are given solely for the purpose of illustration and are not to be construed as limitations of the present invention.

PRODUCTION EXAMPLES

Production of Fat or Oil

The following fat or oil compositions were produced.

Fat or Oil Composition A 455 parts by weight of a soybean oil fatty acid which was decreased in saturated fatty acids by wintering, 195 parts by weight of rapeseed oil fatty acid and 107 parts by weight of glycerol were subjected to esterification which was carried out using liposime IM (manufactured by Novo Nordisk Bio Industry) at 40° C. under a pressure of 0.07 hPa for 5 hours. Then, the enzyme was separated by filtration, and the filtrate was then subjected to molecular distillation (thin film distillation) at 234° C., further discolored and washed with water. The resulting product was deodorized at 230° C. for 2 hours to prepare a fat or oil composition A.

Fat or Oil Composition B 650 parts by weight of rape seed oil fatty acid and 107 parts by weight of glycerol were subjected to esterification in the same manner as in the case of the fat or oil composition A, followed by after-treatment to prepare a fat or oil composition B.

Fat or Oil Composition C 650 parts by weight of soybean fatty acid and 107 parts by weight of glycerol were subjected to esterification in the same manner as in the case of the fat or oil composition A, followed by after-treatment to prepare a fat or oil composition C.

Preparation of fat or oil compositions 1 to 3 as products according to preferred embodiments of the present invention and fat or oil composition 1 as a comparative example.

An antioxidant and vegetable sterols were added to the above fat or oil compositions A, B and C and soybean oil (manufactured by The Nissin Oil Mills, Ltd.) according to the formulations shown in Table 1 to produce fat or oil compositions 1 to 3 as the preferred products of the present invention and comparative fat or oil composition 1, respectively.

Each glyceride composition and fatty acid composition of these fat or oil compositions were investigated. The results are shown in Table 2.

Fat or Oil Composition D 455 parts by weight of a soybean oil fatty acid which was decreased in saturated fatty acids by wintering, 195 parts by weight of rapeseed oil fatty acid and 107 parts by weight of glycerol were subjected to esterification and post-treatment in the same way as Fat or oil composition A. 80 parts by weight of the obtained fat or oil was mixed with 20 parts by weight of a completely hydrogenated oil (melting point of 67° C.) to prepare an fat or oil composition D.

Fat or Oil Composition E 80 parts by weight of soybean oil (manufactured by ADM Company) was mixed with 20 parts by weight of a completely hydrogenated oil (melting point of 67° C.) to prepare an fat or oil composition E.

Fat or Oil Composition F

A hydrogenated soybean oil (melting point of 42° C.) was taken as fat or oil composition F.

Analysis of the constituent fatty acids of diglycerides

A diglyceride fraction from the fat or oil was collected by column chromatography (a triglyceride fraction was removed using Wako Gel C-200 manufactured by Wako Pure Chemical Industries, Ltd. and hexane, and then a diglyceride fraction was obtained using hexane/diethyl ether (70:30)). Next, the diglyceride fraction was analyzed by gas chromatography according to the method described in "Method of preparation of methyl esters of fatty acids" and "Fatty acid composition" of "Standard Analytical Methods for Fat or oil, edited by the Japan Oil Chemists' Society". The composition of the fatty acids in the diglycerides was evaluated based on the retention time and peak area ratio in the obtained chart.

TABLE 1

|  | Present invention | | | Comparative product |
|---|---|---|---|---|
|  | 1 | 2 | 3 | 1 |
| Fat or Oil composition A | 99 | — | — | — |
| Fat or Oil composition B | — | 39.5 | — | — |
| Fat or Oil composition C | — | — | 99 | — |
| Soybean oil | — | 59.5 | — | 99 |
| Monoglycerides | 1 | 1 | 1 | 1 |
| Vitamin E*2 | 0.2 | 0.2 | 0.2 | — |
| Vegetable sterols*3 | — | — | 4.0 | — |

(note)
Each value in the table: parts by weight
*1Exel T-95 manufactured by Kao Corporation
*2E Oil-400 manufactured by Riken Vitamin Co., Ltd.
*3Phytosterol S manufactured by Tama Biochemical Co., Ltd.

TABLE 2

|  | Examples | | | Comparative |
|---|---|---|---|---|
|  | 1 | 2 | 3 | product 1 |
| Triglycerides*1 | 13.1 | 63.4 | 12.2 | 97.9 |
| Diglycerides | 85.0 | 35.1 | 85.6 | 1 |
| (1,3-diglycerides' content) | (56.8) | (23.9) | (57.1) | (–) |
| Monoglycerides | 1.8 | 1.4 | 2.1 | 1.0 |
| Free fatty acids | 0.1 | 0.1 | 0.1 | 0.1 |
| Whole fatty acids |  |  |  |  |
| C16:0 | 3.3 | 8.7 | 10.9 | 10.9 |
| C18:0 | 2.0 | 4.4 | 5.4 | 5.4 |
| C18:1 Cis | 37.6 | 38.5 | 24.5 | 24.1 |
| C18:1 Trans | 0 | 0.2 | 0 | 0.4 |
| C18:2 Cis | 46.9 | 37.4 | 48.9 | 49.0 |
| C18:2 Trans | 0.5 | 1.4 | 2.1 | 2.1 |
| C18:3 Cis | 7.1 | 6.0 | 3.7 | 4.3 |
| C18:3 Trans | 1.1 | 2.0 | 3.0 | 2.4 |
| diglyceride-constituting fatty acids |  |  |  |  |
| C16:0 | 3.1 | 5.3 | 10.7 | n.t.*2 |
| C18:0 | 1.3 | 2.2 | 4.7 | n.t. |
| C18:1 Cis | 38.0 | 60.2 | 24.7 | n.t. |
| C18:1 Trans | 0 | 0 | 0 | n.t. |
| C18:2 Cis | 47.4 | 20.5 | 49.4 | n.t. |
| C18:2 Trans | 0.5 | 0.3 | 2.2 | n.t. |
| C18:3 Cis | 7.2 | 8.5 | 3.7 | n.t. |
| C18:3 Trans | 1.1 | 1.4 | 3.0 | n.t. |

(note)
Each value in the table: %
*1Measured by gas chromatography after trimethylsilylating
*2Unmeasured

TABLE 3

|  | Example Product | Comparative Product | |
|---|---|---|---|
| Fat or oil composition | D | E | F |
| Triglycerides*1 | 33.7 | 98.8 | 98.8 |
| Diglycerides | 65.4 | 1.2 | 1.0 |
| Monoglycerides | 0.9 | 0 | 0.1 |
| Free fatty acids | 0 | 0 | 0.1 |
| Whole fatty acids |  |  |  |
| C16:0 | 4.7 | 10.5 | 10.9 |
| C18:0 | 18.3 | 20.7 | 15.6 |
| C18:1 Cis | 31.1 | 17.5 | 22.6 |
| C18:1 Trans | 0.1 | 0.1 | 42.7 |
| C18:2 Cis | 36.6 | 41.7 | 0 |
| C18:2 Trans | 1.8 | 0.6 | 0 |
| C18:3 Cis | 4.0 | 5.4 | 0 |
| C18:3 Trans | 3.0 | 1.0 | 0 |
| Diglyceride-constituting fatty acids |  |  |  |
| C16:0 | 3.1 | n.t. | n.t.*2 |
| C18:0 | 1.2 | n.t. | n.t. |
| C18:1 Cis | 38.8 | n.t. | n.t. |
| C18:1 Trans | 0 | n.t. | n.t. |
| C18:2 Cis | 45.7 | n.t. | n.t. |
| C18:2 Trans | 2.2 | n.t. | n.t. |
| C18:3 Cis | 5.0 | n.t. | n.t. |
| C18:3 Trans | 3.8 | n.t. | n.t. |

Each value of the table: %
*1Measured by gas chromatography after trimethylsilylating
*2Unmeasured

Examples 1 to 4 and Comparative Example 1

Preparation and Evaluation of Foamable Oil-in-water Type Emulsions

Foamable oil-in-water type emulsions having the following formulations were prepared using the fat or oil (fat or oil compositions 1 to 3 as products according to preferred embodiments of the present invention and fat or oil composition 1 as the comparative product) produced in Production Example 1.

| (Oil phase) | |
|---|---|
| Fat or oil | 15 parts by weight |
| Soybean lecithin*1 | 0.3 |
| (Water phase) | |
| Glucose | 22.5 |
| Maltose | 22.5 |
| Sodium caseinate | 0.5 |
| Skimmilk powder | 5.0 |
| Xanthane gum | 0.1 |
| Sodium hexa metaphosphate | 0.1 |
| Sucrose fatty acid ester*2 | 0.5 |
| Water | 33.5 |

*1Lecithin DX manufactured by The Nissin Oil Mills, Ltd.
*2S-1170 manufactured by Mitsubishi Chemical Foods First, the oil phase was mixed with the water phase and the mixed phase was pre-emulsified (8000 rpm, 10 minutes) using a homomixer (manufactured by Tokushukika Kogyo). Next, the pre-emulsion was subjected to a high-pressure emulsifying treatment (19.6 MPa, two-pass) performed using a high-pressure homogenizer (HV-0A-2.4-2.2S model, manufactured by Izumi Food Machinery) at 65° C.

The resulting mixture was stored at 5° C. for 20 hours to prepare an oil-in-water type emulsion and the average particle diameter of this emulsion was measured. Each resulting emulsion obtained was stirred by a Hobart mixer (N-50 model, manufactured by HOBART) to obtain foaming products and each specific gravity of these products was measured. Further, the sweet-taste quality and aqueous taste of each product were sensuously evaluated by 10 panelists according to the following evaluation standard (Examples 1 to 3 and Comparative Example 1). The pre-emulsion of the fat or oil composition 1 was evaluated in the same manner as above (Example 4).

The foamed products were stored at −18° C. for 30 days and then were sensuously evaluated determined in view of flavor (fresh taste). Results are shown in Table 4.

(Sweet-taste Quality)
A: Sweet-taste is not heavy at all but very excellent.
B: Sweet-taste is not heavy but excellent.
C: Sweet-taste is slightly heavy, but not good.
D: Sweet-taste is heavy and gives a disagreeable taste.

(Aqueous Taste)
A: Very high aqueous taste, substantially free from an oily taste and very excellent.
B: High aqueous taste, almost free from an oily taste and excellent.
C: Slightly aqueous taste and an oily taste, but not good.
D: Not much aqueous taste having an oily taste and unpleasant.

(Fresh Taste)
A: Strongly fresh taste and very good.
B: Slightly fresh taste and good.
C: Not so fresh taste and not good.
D: Not fresh in taste and unpleasant.

As a result, as shown in Table 4, all the products of the present invention had high foaming characteristics and an aqueous taste and also a high quality sweet taste.

TABLE 4

|  | Example 1 | Example 2 | Example 3 | Example 4 | Comparative example 1 |
|---|---|---|---|---|---|
| Average particle diameter of the oil-in-water type emulsion (μm) | 0.47 | 0.43 | 0.48 | 2.35 | 0.41 |
| Specific gravity of the foamed product (g/cm$^2$) | 0.44 | 0.52 | 0.45 | 0.63 | 0.57 |
| Aqueous taste | A | B | A | B | B |
| Sweet taste | B | B | B | C | D |
| Taste after preservation | A | A | B | A | B |

Example 5

Preparation and Evaluation of a Lacto-ice

A lacto-ice (between 3% to less than 15% milk fat content) was prepared according to the following formulation by using the fat or oil composition 1 produced in the above production example.

| (Oil phase) | |
| --- | --- |
| Fat or oil composition 1 | 21.0 parts by weight |
| Catechin | 0.042 |
| (Water phase) | |
| Water | 61.578 |
| Sugar | 12.0 |
| Emulsifier*[1] | 1.66 |
| Sodium caseinate | 3.72 |

*[1]Mixed product of P-1670 (cane sugar fatty acid ester) manufactured by Mitsubishi Chemical Foods and S-570 (cane sugar fatty acid ester) manufactured by Mitsubishi Chemical Foods (1:1, w/w).

First, the sugar, the emulsifier and the sodium caseinate were poured into water and the mixture was heated to 70° C. The fat or oil composition land catechin were added dropwise to the mixture while stirring the mixture using a homomixer (5000 rpm). After the addition was finished, the resulting mixture was further subjected to emulsifying treatment performed at 8000 rpm for 5 minutes. Then, the emulsified mixture was allowed to cool down and then was subjected to a high-pressure emulsifying treatment (176 MPa, three-pass) performed using a high-pressure homogenizer. (LAB 2000 model, manufactured by An Invensys Company).

The resulting emulsion was stored at 5° C. for 20 hours to prepare an oil-in-water emulsion, and then the average particle diameter by volume of the emulsion was measured, wherein the diameter was determined to be 0.09 μm. The resulting emulsion was stirred for 9 minutes under sodium salt ice-cooling by using a hand mixer (MK-H2 model, manufactured by Matsushita Electric Industrial Co., Ltd.)

A part of the emulsion was sampled and the specific gravity of the sample was measured by the volume method, wherein the specific gravity was determined to be 0.66 g/cm$^3$. The remaining emulsion was placed immediately in a freezing chamber kept at −18° C. to produce a lacto-ice.

The sweet-taste quality and aqueous taste of this lacto-ice were evaluated in the same manner as in the above example, wherein both were ranked as "A". Also, comments were made that the lacto-ice exhibited very rapid melting in the mouth so that it dissolved quickly like sherbet in the mouth, and also had a strong milky taste and full-body taste.

As mentioned above, the lacto-ice produced using the foamable oil-in-water type emulsion of the present invention is not oily but rich in an aqueous taste, has an elegant sweet taste and rapid melting in the mouth. Also, the foamable oil-in-water type emulsion of the present invention has excellent foaming characteristics even if it was not combined with a hydrogenated oil or the like.

Example 6 and Comparative Example 2, 3

Preparation and Evaluation of Foamable Water-in-oil Emulsion

Foamable water-in-oil emulsions having the below described compositions, respectively, were prepared by using fat or oil compositions D, E and F obtained in the above described preparations, respectively.

| (Oil phase) | |
|---|---|
| Fat or oil composition | 15.0 parts by weight |
| (Water phase) | |
| Water | 65.6 |
| Sugar | 15.0 |
| Emulsifier*[1] | 0.4 |
| Sodium caseinate | 4.0 |

*[1]Mixed product of PO-500 (polyglycerin fatty acid ester) manufactured by Sakamoto Yakuhin Kogyo and MO-500 (polyglycerin fatty acid ester) manufactured by Sakamoto Yakuhin Kogyo (1:1, w/w).

Sugar, the emulsifier and sodium caseinate were introduced in water and the mixture was heated to 80° C. While being agitated with a homomixer (3000 rpm), the fat or oil composition, heated at 80° C., was added dropwise to it. After the addition, the mixture was stirred at 5000 rpm for 4 minutes and then at 7000 rpm for 4 minutes.

The obtained emulsified product was stirred, while being cooled with water, by way of a hand mixer, BHA-06 type, manufactured by ZoZirushi MahoBin Co., Ltd., for 1 minute. Part of it was taken and determined in view of specific gravity according to the volume method. The remainder was immediately put in a refrigerator adjusted at −18° C. to produce a foamable water-in-oil type emulsion. The foamable water-in-oil type emulsion was stored at −18° C. for 1 week and then was sensuously determined in view of sweet taste, aqueous taste, fresh taste in the same way as the preceding example. Results are shown in Table 5.

TABLE 5

| | Fat or oil composition | Specific gravity g/cm$^3$ | Sweet taste | Aqueous taste | Fresh taste | Note |
|---|---|---|---|---|---|---|
| Example 6 | D | 0.88 | A | A | A | No hardening smell, rapid melting in the mouth and full body taste |
| Comparative Example 2 | E | 0.88 | C | B | B | No hardening smell |
| Comparative Example 3 | F | 0.89 | D | C | D | Much hardening smell, unpleasant |

The foamable water-in-oil type emulsion of the invention is rich in fresh taste and aqueous taste, having a favorable sweet taste. Combination of diglycerides with a completely hydrogenated oil improves melting in the mouth and its full body taste much better. The comparative product using the fat or oil composition F, on the other hand, offers a strong hardening smell and an unpleasant taste.

What is claimed is:

1. A foamed composition obtained by foaming an oil-in-water type emulsion comprising the following (A), (B) and (C):
   (A) from 7 to 35% by weight of an oil phase consisting of fat or oil consisting of from 1 to 69.9% by weight of triglycerides, from 0.1 to 9% by weight of monoglycerides and from 30 to 90% by weight of diglycerides, and optionally a vegetable sterol and optionally an antioxidant wherein 80% by weight or more of the fatty acids in the diglycerides are unsaturated fatty acids, wherein 0 to 20% by weight of the fatty acids in the fat or oil are saturated fatty acids, and wherein less than 10% by weight of the fatty acids in the fat or oil are trans acids;
   (B) from 65 to 93% by weight of a water phase, wherein the water phase comprises from 15 to 60% by weight of sugars, sugar alcohols, and mixtures thereof; and
   (C) an emulsifier having an HLB of 8 or more
   wherein the volume-average particle diameter of said oil-in-water type emulsion is from 0.9 gm or less and wherein said composition has a specific gravity of from 0.1 to 0.9 g/cm$^3$.

2. The foamed composition according to claim 1, wherein said emulsifier is present in an amount of from 0.1 to 5 parts by weight based on 100 parts by weight of the emulsion.

3. The foamed composition according to claim 1 or 2, the emulsion further comprising a protein in an amount of from 0.1 to 10 parts by weight based on 100 parts by weight of the emulsion.

4. A method of producing the foamed composition according to claim 1, the method comprising performing a high-pressure emulsifying treatment under a pressure of from 78.5 to 490 MPa.

5. The foamed composition according to claim 1, wherein 90 to 100% of said unsaturated fatty acids have 10 to 24 carbon atoms.

6. The foamed composition according to claim 1, wherein fatty acids of said diglyceride are 20-65% of oleic acid.

7. The foamed composition according to claim 1, wherein fatty acids of said diglyceride are 15-65% of linoleic acid.

8. The foamed composition according to claim 1, wherein fatty acids of said diglyceride are less than 15% of linolenic acid.

9. The foamed composition according to claim 1, wherein said diglyceride has at least 50% of 1,3-diglycerides.

10. The foamed composition according to claim 1, wherein said sugars, sugar alcohol, and mixtures thereof is at least one selected from the group consisting of glucose, fructose, maltose, sucrose, lactose, sucralose, sorbitol, maltitol, erythritol, xylitol trehalose, reduced starch saccharides, isomerized sugars and starch syrups.

11. The foamed composition according to claim 1, wherein the emulsion has a specific gravity of from 0.3 to 0.7 g/cm$^3$.

12. The foamed composition according to claim 1, wherein all the constituent fatty acids have 0.1 to 5 wt. % of trans acids.

13. The foamed composition according to claim 1, further consisting of 0.05 to 4.7 parts by weight of vegetable sterol to 100 parts by weight of the fat or oil.

14. The foamed composition according to claim 1, wherein the volume-average particle size is 0.05 gm to 0.3 gm.

15. The foamed composition according to claim 1, wherein a ratio by weight of said fat or oil to said emulsifier is 25/1 to 5/1.

16. The foamed composition according to claim 1, wherein a ratio by weight of said fat or oil to said emulsifier is 20/1 to 5/1.

17. The foamed composition according to claim 1, wherein a ratio by weight of said fat or oil to said emulsifier is 18/1 to 5/1.

* * * * *